United States Patent
Rao et al.

(12) 
(10) Patent No.: US 6,170,605 B1
(45) Date of Patent: Jan. 9, 2001

(54) PANEL FOR ABSORBING ACOUSTIC ENERGY

(75) Inventors: Dattatray Rao, West Islip; John Koch, Smithtown, both of NY (US); Bao Vo, Anaheim; Clay Simpson, Riverside, both of CA (US)

(73) Assignee: The Soundcoat Company, Inc., Deer Park, NY (US)

( * ) Notice: Under 35 U.S.C. 154(b), the term of this patent shall be extended for 0 days.

(21) Appl. No.: 09/296,932

(22) Filed: Apr. 22, 1999

(Under 37 CFR 1.47)

(51) Int. Cl.[7] .................................................... E04B 1/84
(52) U.S. Cl. ............................................ 181/290; 181/294
(58) Field of Search ................................. 181/207, 208, 181/286, 290, 292, 293, 294, 295

(56) References Cited

U.S. PATENT DOCUMENTS

| | | | |
|---|---|---|---|
| 5,453,584 | * | 9/1995 | Borello ................................. 181/207 |
| 5,473,122 | * | 12/1995 | Kodiyalam et al. .................. 181/207 |
| 5,670,758 | | 9/1997 | Borchers et al. . | |

OTHER PUBLICATIONS

Carosso, Nancy, "Keeping Things Clean: Insights Into Spacecraft Contamination", *Launchspace*, Jun./Jul. 1998, pp. 59–62.

* cited by examiner

Primary Examiner—Khanh Dang
(74) Attorney, Agent, or Firm—Cohen, Pontani, Lieberman & Pavane (57) ABSTRACT

Lightweight acoustic absorbers. The acoustic absorbers absorb energy during launch of a vehicle by a rocket, and are adapted to line the inside of a cavity of a fairing containing a vehicle. The absorbers comprise acoustic absorbing members, and a layer substantially surrounding the acoustic absorbing member which is substantially impermeable to contaminating particulates found within the fairing, and substantially impermeable to any contaminants which may be emitted by the acoustic absorbing member. A plurality of vents are cut in the layer, and a filter is placed over the vents to filter out any contaminants. The vents allow the gases within the fairing and the acoustic absorbing member to pass therethrough, thereby compensating for differential pressure.

35 Claims, 4 Drawing Sheets

PANEL FOR ABSORBING ACOUSTIC ENERGY

BACKGROUND OF THE INVENTION

1. Field of the Invention

This invention relates generally to acoustic absorbers. More particularly, this invention relates to lightweight acoustic absorbers that absorb energy during launch of a vehicle by a rocket, and which generally prevent contamination of a fairing containing the vehicle.

2. Description of the Related Art

Since the beginning of the United States Space Program in the '60s, payloads such as satellites have been lifted by expendable and non-expendable launch vehicles into orbit and beyond. Typically, a payload fairing is provided to house the vehicle or satellite and to prevent damage to the vehicles therein before and after launch. Fairings have been used extensively in the payload lifting art, and will be continued to be used as this art progresses to more sophisticated land based launches and the new expected sea launch of space vehicles and payloads.

Fairings and payloads are typically mounted to the top of the rocket and are thus subjected to severe forces. Aerodynamic, heat, and acoustic forces all combine to produce a stressful and mechanically challenging environment for the satellite within the fairing. In particular, acoustic emissions which occur in connection with the launch of the vehicle, and which are produced by the thrust of the rocket, can exceed 140 dB. Such intense acoustic loads can damage the satellite within the fairing and contribute to the degradation of performance of satellite subsystems such as solar cells, control systems, and communication systems.

In order to alleviate some of these problems, it has been known in the art to use acoustic protection on the inside of fairings. See, for example, U.S. Pat. No. 5,670,758, Borchers et al., the teachings of which are expressly incorporated herein by reference. In the Borchers, et al. patent, acoustic panels are tuned to absorb energy in a defined frequency range and are disposed on foam plastic mats and fastened on the inside of the payload fairing. A complex homed structure having tapered ends and curved conical members form the acoustic panels of Borchers et al. and are intended to reduce the acoustic load experienced by the fairing before and during launch.

The panels of the Borchers et al. patent comprise a series of foamed plastic mats of a reticulated polyimide for example, the polyimide sold under the trade name Solimide AC406 available from the Illbruck firm in Switzerland. Other polyimide foams are also usable in acoustic absorbers. One of the major problems with these types of foams however is that they tend to emit particles into the atmosphere of the fairing which contaminate the atmosphere and can settle on portions of the payload, thereby damaging or impeding the performance of the payload during launch and later on in orbit. In order to address this problem, the absorbing polyimide foams of the Borchers et al. patent are covered by protective foils, which are provided in an attempt to prevent leakage of the contaminants from the foam into the fairing atmosphere.

In order to accommodate changes of atmospheric pressure in the fairing during launch that causes the absorbing panels to expand, fine perforations are placed in the protective foils of Borchers et al. to allow for the differential pressure. However, the thin protective foil is not placed around the entire absorbing foam in the Borchers et al. patent and the sides of the panel which are not covered by the foil must be adhered to the fairing surfaces directly which allows for outgassing from the foam to occur and for the panel to become easily detached from the fairing wall which is threatening to the payload.

The sound absorbing panels of the Borchers et al. patent require complicated structures to be formed out of the polyimide material. Furthermore, since the thin protective foil which covers one side of the panels of Borchers et al. does not encompass the entire foam structure, there still remains the dangerous possibility of a leak of contaminants into the fairing's atmosphere and vice-versa. The requirement that the entire side of the supporting surface of the foam plastic mats be adhered to the inside of the fairing of Borchers et al. also allows for the strong possibility that the foamed material will be exposed to the atmosphere of the fairing during launch should the foam shake loose from the fairing, or not be adhered correctly and efficiently during the adhesion process. Additionally, the use of fine perforations in the protective foil will also allow gases to escape into the fairing atmosphere and does not provide for adequate differential pressure compensation and further increases the possibility of contaminating the fairing's atmosphere with the foamed material.

Prior acoustic absorbing panels have been secured to the inside walls of fairings with mechanical fasteners such as VELCRO, grommets, screws and brads. This way of securing acoustic absorbing panels to the fairing is inefficient and dangerous since during liftoff the panels can become disengaged from the fairing surface due to the severe forces that are generated. Additionally, the use of mechanical fasteners greatly increases installation time and is therefore also economically inefficient. Further, the mechanical fasteners undesirably increase the weight of the acoustic absorbing panels. Thus, prior mechanical fastening of acoustic panels to fairings is not safe, economical or effective.

There thus remains a long felt need in the art for an effective acoustic absorbing panel that can efficiently and adequately ensure that the payload is not subjected to acoustic stresses before and during launch, and is not subjected to dangerous contaminants and funguses which are the natural result of the use of a sound absorbing foam. Such needs have not heretofore been fulfilled in the art.

SUMMARY OF THE INVENTION

The aforementioned long felt needs are met, and problems solved, by acoustic absorbers provided in accordance with the present invention. In a preferred embodiment, the acoustic absorbers comprise foam absorbing means for absorbing acoustic vibrations in a specified frequency range. The acoustic absorbers further comprise impermeable means, attached to the foam absorbing means, to prevent contaminants from escaping from the foam absorbing means to atmospheric gases. Still more preferably, the acoustic absorbers comprise vent means, formed in the impermeable means, for allowing gases to pass through the foam absorbing means. Still more preferably, filter means, placed over the vent means, are provided for filtering the contaminants so that they do not contaminate the atmospheric gases and so particulates in the atmospheric gases do not contaminate the foam absorbing means.

In a further preferred aspect of the invention, light-weight acoustic absorbers are provided for absorbing acoustic energy during launch of a vehicle by a rocket, the acoustic absorbers being adapted to line an inside cavity of a failing containing the vehicle. Yet more preferably, the acoustic absorbers comprise an acoustic absorbing member which absorbs acoustic energy in a specified frequency range, and which is substantially permeable to gases during launch of the vehicle. Still more preferably the acoustic absorbers comprise a layer, substantially surrounding the acoustic absorbing member, which is substantially impermeable to the gases and substantially impermeable to any contaminants which may be emitted by the acoustic absorbing member. In still a further preferred embodiment, the acoustic absorbers comprise a plurality of vents formed in the layer, which provide gas communication through the acoustic absorbing member to accommodate changes in pressure of the gases during launch, so as to prevent ballooning of the acoustic absorber during launch. Yet even more preferably, a plurality of filters is provided in one-to-one correspondence with the vents, which are permeable to the gases, but impermeable to the contaminants.

The acoustic absorbers provided in accordance with the present invention satisfy long felt needs in the art for efficient absorption of acoustic driving forces to protect payloads and fairings before and during launch. These absorbers also completely protect payloads from contaminant particles which may escape from the acoustic absorbing foams which comprise the panels, and are themselves protected from deleterious contaminants in the atmosphere of the fairings and from solvents the absorbers may come into contact with during storage or handling. Additionally by judicious choice of panel components in accordance with the present invention, contamination of the atmosphere is reduced and the growth of common funguses which occurs in prior sound absorbing panels during storage is markedly decreased. Certain subcomponents of the panels and acoustic absorbers of the present invention are constructed in accordance with military standards which require the highest degree of cleanliness and product integrity. In particular, these subcomponents of the sound absorbing panels described and claimed herein meet or exceed the requirements of MIL-STD-1246C (Apr. 11, 1994), the teachings of which are expressly incorporated herein by reference. It will be recognized by those skilled in the art that the panels of the present invention may be constructed in accordance with other common standards such as those available from the National Aeronautics and Space Administration (NASA) and the American Society for the Testing of Materials (ASTM), for example.

Furthermore with the efficient use of a vent system, the panels do not expand due to differential pressures during launch, thereby protecting the payload during launch. Since the absorbers of the present invention do not require any complicated structures, they are economical to fabricate, and simple to mount to a surface of the fairing. Such results have not heretofore been achieved in the art.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views thereof.

DETAILED DESCRIPTION OF THE PRESENTLY PREFERRED EMBODIMENTS

Figure 1:
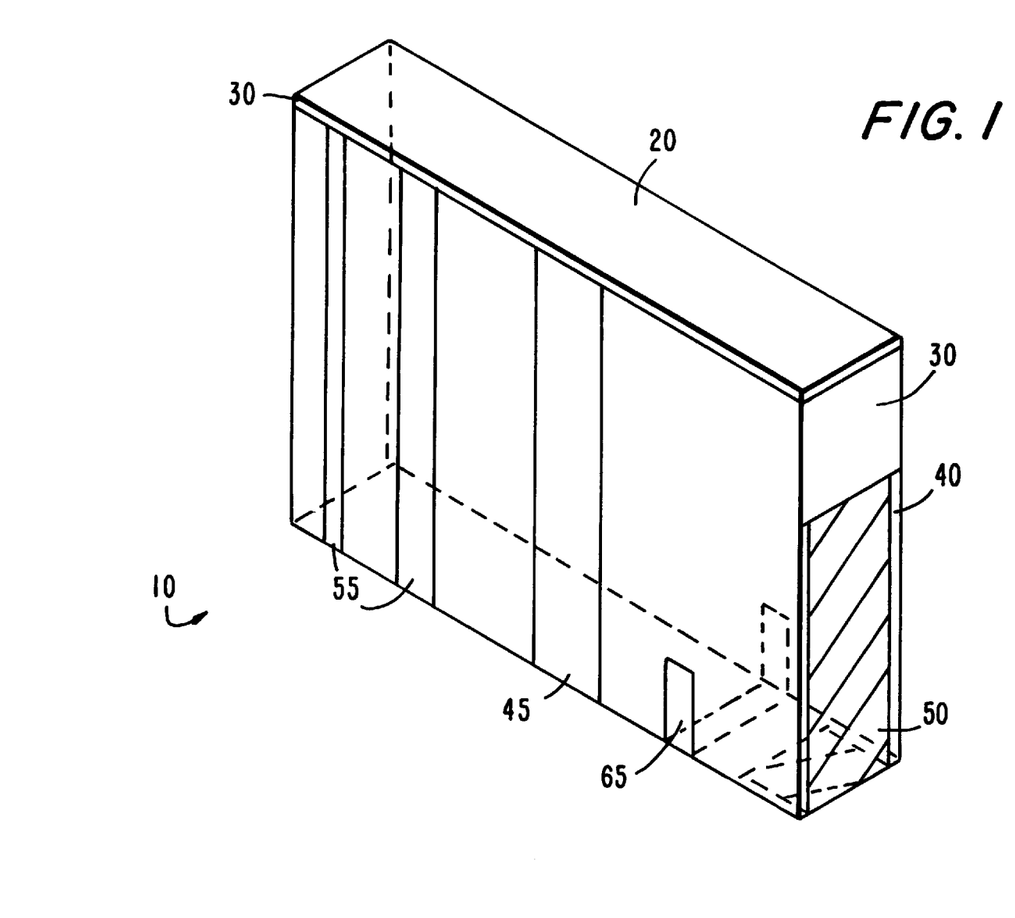
FIG. 1 is a perspective view of an acoustic absorbing panel provided in accordance with the present invention.

Referring now to the drawings, in FIG. 1 a lightweight acoustic absorbing panel is shown generally at 10. The absorbing panels of the present invention are particularly useful for absorbing acoustical energy created during a launch of a rocket. As used herein, the term "launch" denotes the period of time beginning with the ignition of the rocket carrying the fairing and payload, during liftoff and ascent of the rocket, through the time when the fairing and payload finally separate from the rocket. The acoustic absorbing panels 10 also protect the payload within the fairing before launch from contamination and electrostatic discharge (ESD) which may occur as various electrical systems of the payload and the rocket are used and tested, for example. In particular, the panels described herein advantageously line the inside surface of a fairing containing a vehicle, payload or satellite, as the terms are used interchangeably herein, which is susceptible to damage from acoustic vibration. However, it will be recognized by those with skill in the art that the acoustic absorbing panels of the present invention can be used in any environment in which absorption of acoustic energy is required to protect mechanical, electrical and other systems.

Preferably, the acoustic absorber 10 comprises an acoustic absorbing member 20 which absorbs acoustic energy in a specified frequency range. When placed within a failing, which has an atmosphere such as oxygen, nitrogen, or a combination thereof and other gases, the panel 10 will experience a differential pressure during the launch and ascent of the rocket, fairing and payload. That is, as the rocket traverses upward towards the ultimate delivery of the payload in space for its mission, the atmospheric pressure within the fairing will decrease, which tends to force the panel 10 to expand. Should the acoustic panel 10 expand to any significant degree, it may touch the payload, thereby damaging or contaminating it. This is an unacceptable situation, and so panel 10 must be substantially permeable to the atmospheric gases within the fairing to compensate for the differential pressure and concomitant ballooning. In prior art acoustic absorbing panels, this generally entails exposing the acoustic absorbing members directly to the fairing's atmosphere. However, the foam materials of prior art panels, usually polyimide-type materials that can absorb acoustic energy, emit contaminants such as inorganic or organic particles which are a natural result of the decay of the foam materials. Furthermore, funguses can grow in such acoustic absorbing members which also may escape therefrom and contaminate the payload. These particles and contaminants are particularly detrimental to a payload within the fairing and if they settle thereon, can substantially hinder the performance of the payload and its systems, or completely degrade the performance so as to make the payload unusable in orbit or otherwise during its mission.

In accordance with the invention, it is preferable to provide a layer 30 that is attached to a surface of the acoustic absorbing member 20 and that is substantially impermeable to the gases within the fairing, and further substantially impermeable to any contaminants which may be emitted by the acoustic absorbing member. Layer 30 is also preferably impermeable to any contaminants which may be found in the fairing's atmosphere. Alternatively, layer 30 may substantially surround the-entire acoustic absorbing member 20.

The layer 30 is substantially impermeable to the gases in the fairing. Moreover, the particulates emitted by the absorbing member 20 cannot traverse through layer 30 to the fairing's atmosphere. Additionally, any contaminants found in the atmosphere of the fairing are larger than the interstitial spacing of the material of the layer 30 and so cannot traverse into the absorbing member 20 to contaminate it and cause the growth of undesired funguses and the like which will damage the acoustic absorbing member 20 and potentially damage the payload if they leak back into the atmosphere of the fairing.

Since layer 30 is substantially impermeable to the fairing's atmospheric gases, it is desired to cut vents 40 in the layer 30 to provide gas communication through acoustic member 20 to accommodate the changes in pressure of the atmospheric gases during launch. This prevents ballooning of the acoustic absorber 10 in the fairing during launch of the payload. Vents 40 can be cut on any location of layer 30 depending upon the particular application in which the panels of the present invention will be used and the physical geometry of the fairing. Thus, the vents 40 could be cut in the face of layer 30 or on the sides thereof. Presently, it has been determined that cutting vents on the sides of the layer 30 achieves the best results for equalizing atmospheric pressure changes during launch.

However, it will also be recognized that the cutting of the vents 40 would potentially allow the contaminants of the foam of acoustic absorbing member 20 to leak therethrough and for any fungus therein to attack the payload, and so it is further desired to place a plurality of filters 50 in one-to-one correspondence with the vents 40. Even more preferably the filters 50 are permeable to the atmospheric gas, but impermeable to the contaminants, thereby allowing the different preferential pressure to be compensated during launch but preventing the contaminants from leaking through the vents 40. Thus, the atmospheric gases and gases trapped within the panel 10 traverse through the filters 50 and vents 40, through acoustic absorbing member 20 and are expelled from and pass through the panels 10 during launch, thereby compensating for the differential pressure and preventing ballooning.

The panels 10 can be installed inside the payload fairing to effectively protect the payload against acoustic emissions and vibrations. By use of the simple vent and filter combination described herein, the panels of the present invention do not have the disadvantages or complexities of previously known acoustic protective systems as described above. In a preferred embodiment, the panels 10 effectively absorb acoustic vibrations in a range of about 125 to about 4,000 Hz. Even more particularly, the polyimide foams which comprise acoustic absorbing members 20 absorb structural vibration at about 125, 250, 500, 1,000 and 2,000 Hz respectively, which are the typical acoustic driving frequencies that are generated during the launch of a rocket.

Also due to the use of the layer 30 and vent 40/filter 50 combination, the present invention limits the amount of vapor and particulate contamination emitted from the foam of acoustic member 20 to the cavity of the fairing, and ultimately to the payload. Even small releases of organic and inorganic vapors or particulates within the payload fairing may significantly shorten the useful life of a satellite. See, for example, N. Carosso, "Keeping Things Clean: Insights Into Spacecraft Contamination," *Launchspace*, June/July 1998, pages 59–61. For example, the release of silane vapors is known to cloud solar cells which power a satellite, thereby reducing their efficiency and life. It is possible to limit the release of vapors by judiciously selecting the materials to be used in assembling panel 10. Thus selecting the correct acoustic absorbing member or foam 20, the correct layer 30, and the correct vent fabric filter covering 50 will also help to reduce the level of contaminants which escape to the fairing's atmosphere.

Preferably, the acoustic absorbing member 20 comprises a partially reticulated polyimide foam. A particularly advantageous polyimide foam is sold under the trademark Soundfoam HT, available from the SoundCoat Company, the assignee of the present invention. Soundfoam HT is a lightweight, flexible, open cell, polyimide-based foam having excellent resistance to heat, flame and humidity. Soundfoam HT exhibits a very low degree of flammability, does not drip upon ignition, ceases to burn after removal of the source of ignition, and produces a minimum amount of smoke. As compared to previous glass fiber-based acoustical products, SoundFoam HT has better strength, lower compression set, and higher resiliency.

Other polyimide foams are also usable in absorbing panels of the present invention. In particular, it has been found that a polyimide foam that has been densified before constructing the panel allows the finished panel to absorb significantly more acoustic energy than an undensified panel. It has been found that compressing the foam from about 50% to about 75% of its uncompressed height produces a densified foam that has an increased density of from about 7% to about 20%. The foam exhibits a compressive hysteresis since it has a tendency to spring back after compression and so it is not believed possible to achieve more densification with more compression. It will be recognized by those with skill in the art that the amount of densification is a matter of design choice depending upon the type of polyimide foams used in the absorbing panel and the desired level of acoustic energy filtering that must be achieved.

Layer 30 preferably comprises a metallized polyimide. At times it is necessary to ensure that layer 30 can discharge static electricity developed during launch to prevent the potentially destructive problems associated with ESD. Similarly, it will be recognized by those skilled in the art that the amount of resistivity of layer 30 will depend upon the particular ESD environment that is likely to be encountered in the fairing. Preferably, layer 30 will be vapor deposited with a conductive material which provides the particular design parameters desired in order to achieve the proper volume resistivity and to safely discharge any built up electrostatic charge which develops on the panels 10. In a preferred embodiment, layer 30 should have a resistivity value of about 10,000 ohms per square or less to safely handle the ESD problems that may be encountered.

Attaching layer 30 to foam 20 tends to reduce the acoustic absorption properties of panel 10. Thus it is desirable that layer 30 be attached to less than 100% of the surface area of acoustic absorbing member 20. In accordance with the invention, an adhesive is used to attach layer 30 to the surface of acoustic absorbing member 20. In a preferred embodiment, layer 30 is attached to the surface of acoustic absorbing member 20 by an atmospheric gas permeable adhesive. These adhesives are typically acrylic or rubber-based adhesives, although any atmospheric gas permeable adhesive, can be used. The filters 50 are attached to layers 30 with an atmospheric gas impermeable adhesive such as a hot melt adhesive. Similarly, other impermeable adhesives may be used.

The use of the atmospheric gas permeable adhesive, and atmospheric gas impermeable adhesive described respectively above minimizes particulate contamination. Additionally, the particular adhesive pattern that is employed to attach the layer 30 to foam 20 will contribute to the reduction of billowing during launch. It is desired to employ an adhesive pattern that reduces billowing without significantly degrading the acoustic absorption properties of the panel 10. Presently, it has been found that the adhesive to attach layer 30 to foam 20 should cover the surface area of the foam 20 in a pattern of bands that traverse in one direction from the edges of the panel. Even more preferably, a single, thicker strip of adhesive 45 should be placed substantially down the center of the absorbing member 20 (from top to bottom) and progressively thinner strips of adhesive 55 should be placed towards the edges of the member 20.

Filters 50 can be attached to the acoustic members 20 in one of two ways. First, filter fabric 50 can be attached directly to the surface of acoustic absorbing member 20 with the atmospheric gas permeable adhesive. Alternatively, layer 30 can be attached to the surface of the acoustic absorbing foam 20 with the atmospheric gas permeable adhesive, and the filters can be attached to layer 30 directly.

In still a further preferred embodiment, the material of filter 50 is selected to prevent communication or passage of particles which are greater than 2 microns in diameter in order to accommodate rapid changes in atmospheric pressure without significant distortion in the shape of panel 10. Layer 50 preferably allows the passage of the atmosphere at a rate of 3.4 to 3.5 scfm. In this range, vents 40 can be provided to limit the increase in the thickness of the panels during launch by 5% or less. That is, the thickness of the panels will not increase by more than 5% during launch. This prevents the panels from ballooning and touching the payload during launch. Still more preferably, vents 40 should limit the internal pressure of panel 10 to no more than a half pound per square inch when the panels are exposed to pressure decreases of a half-pound per second during ascent of the rocket In yet a further preferred embodiment, filter 50 comprises a non-woven polyester material.

The number and area of vents 40 that should be placed in layer 30 are dependent upon the permeability of filters 50, and other factors. In a preferred aspect of the invention, the total area of vents 40 is typically 5%, of the entire area of layer 30. Even more preferably, the vents 40 are cut at even intervals in layer 30, and layer 30 allows the passage of atmospheric gases at a rate of 3.4 to 3.5 scfm. Vents 40 can be located anywhere on layer 30, but they are preferably located along the edge of panel 10. It will be recognized by those with skill in the art that a gas impermeable foam might also be used for member 20. In such case, the spaces between the member 20 and layer 30 would have to be appropriately vented to prevent ballooning. The placement of vents in this situation will naturally be readily determinable by the skilled artisan.

Comparative tests have been conducted to measure and compare the acoustic absorption of 3" thick fiberglass panels which have been used in the past as fairing acoustic absorbers, compared to 3" thick panels constructed in accordance with the present invention. The tests were conducted in accordance with the specification of the ASTM; ASTM C423-90a, the teachings of which are expressly incorporated herein by reference. For purposes of the test, the metallized polyimide facing layer 30 was placed onto the foam member 20 without adhesive so that a stable, wrinkle-free facing was achieved with the foam edges covered. The sound pressure level decay times were measured in a reverberation room test facility which had an approximately 80 square foot size test sample therein.

An input acoustic spectrum with random noise from 20 to 20,000 Hz was used. A microphone was calibrated prior to each test using a sound level calibrator. An analyzer's parameters were set at a filter bandwidth of $\frac{1}{3}$ octave, and an analysis band of 20 to 20,000 Hz with averaging of $\frac{1}{16}$ second linear. Acoustic decay times were used to calculate the random incident absorption coefficient for the panels as a function of frequency. Table 1 below shows the absorption of the fiberglass panels, while Table 2 shows the acoustic absorption of the 3" thick panels of the present invention, wherein "Alpha" is the acoustical absorption coefficient at the stated frequency.

TABLE 1

Sample Area = 6.03225 square meters
Temperature = 22.2 degrees C. Relative Humidity = 82%

| Channel | Hz | Alpha | Var |
|---|---|---|---|
| 24 | 250 | .647 | .0193* |
| 25 | 315 | .784 | .0117* |
| 26 | 400 | 1.016 | .0194* |
| 27 | 500 | 1.233 | .0171* |
| 28 | 630 | 1.158 | .0147* |
| 29 | 800 | 1.221 | .0137* |
| 30 | 1000 | 1.103 | .0134* |
| 31 | 1250 | 1.058 | .0103* |
| 32 | 1600 | .964 | .0108 |
| 33 | 2000 | .907 | .0069 |
| 34 | 2500 | .873 | .0098 |
| 35 | 3150 | .792 | .0134 |
| 36 | 4000 | .647 | .0148 |
| 37 | 5000 | .723 | .0155 |

TABLE 2

Sample Area = 6.352 square meters
Temperature = 23 degrees C. Relative Humidity = 55%

| Channel | Hz | Alpha | Var |
|---|---|---|---|
| 24 | 250 | .802 | .0193* |
| 25 | 315 | 1.071 | .0117* |
| 26 | 400 | 1.320 | .0194* |
| 27 | 500 | 1.254 | .0171* |
| 28 | 630 | 1.188 | .0147* |
| 29 | 800 | 1.097 | .0137* |
| 30 | 1000 | 1.041 | .0134* |
| 31 | 1250 | 1.162 | .0103* |
| 32 | 1600 | 1.164 | .0108 |
| 33 | 2000 | 1.097 | .0069 |
| 34 | 2500 | .972 | .0098 |
| 35 | 3150 | .655 | .0134 |
| 36 | 4000 | .854 | .0148 |
| 37 | 5000 | .832 | .0155 |

As can be seen by Tables 1 and 2, the panels of the present invention outperformed the fiberglass panels in absorbing the acoustic energy. Furthermore, the acoustic absorbing panels of the present invention are about 18% lighter in weight than fiberglass panels. Additionally, since the panels of the present invention are constructed of soft, pliable materials as compared to prior art acoustic absorbing panels, they can be sculpted or formed with cutouts so that satellite components can fit in the cutouts and make clearances within the fairing. This is not possible with prior fiberglass panels. Advantageously, the acoustic absorbing panels of the present invention do not shift from their installed positions, but fiberglass panels tend to migrate due to the non-cohesive physical nature of individual fibers therein.

Tests were also performed by the assignee of the present invention to quantify the sound absorption performance of the panels of the present invention as a function of the adhesion pattern of the adhesive on the member 20 for securing layer 30 thereto. These tests were performed with similar equipment and to the same ASTM standards as mentioned above. Four different panels were examined to determine their noise reduction coefficients ("NCR"), (1) a contoured Soundfoam HT panel having a "strip-adhered" layer wherein the adhesive was laid down on the absorbing member 20 in strips 45, 55 (FIG. 1) substantially as described above, (2) a contoured Soundfoam HT panel having adhesive fully covering member 20, (3) a contoured Soundfoam HT panel without a layer 30, and (4) a flat panel comprised only of SoundFoam HT. The first panel displayed a NRC of about 0.80, the second panel displayed a NRC of about 0.65, the third panel displayed a NRC of about 0.90, and the fourth panel displayed a NRC of about 0.90. Thus, adding the protective layer 30 tends to decrease acoustic absorption performance, but adhering layer 30 to member 20 with an adhesive in strips produces a panel 10 with better sound absorbing properties than fully adhering the layer 30 to member 20.

Figure 2:
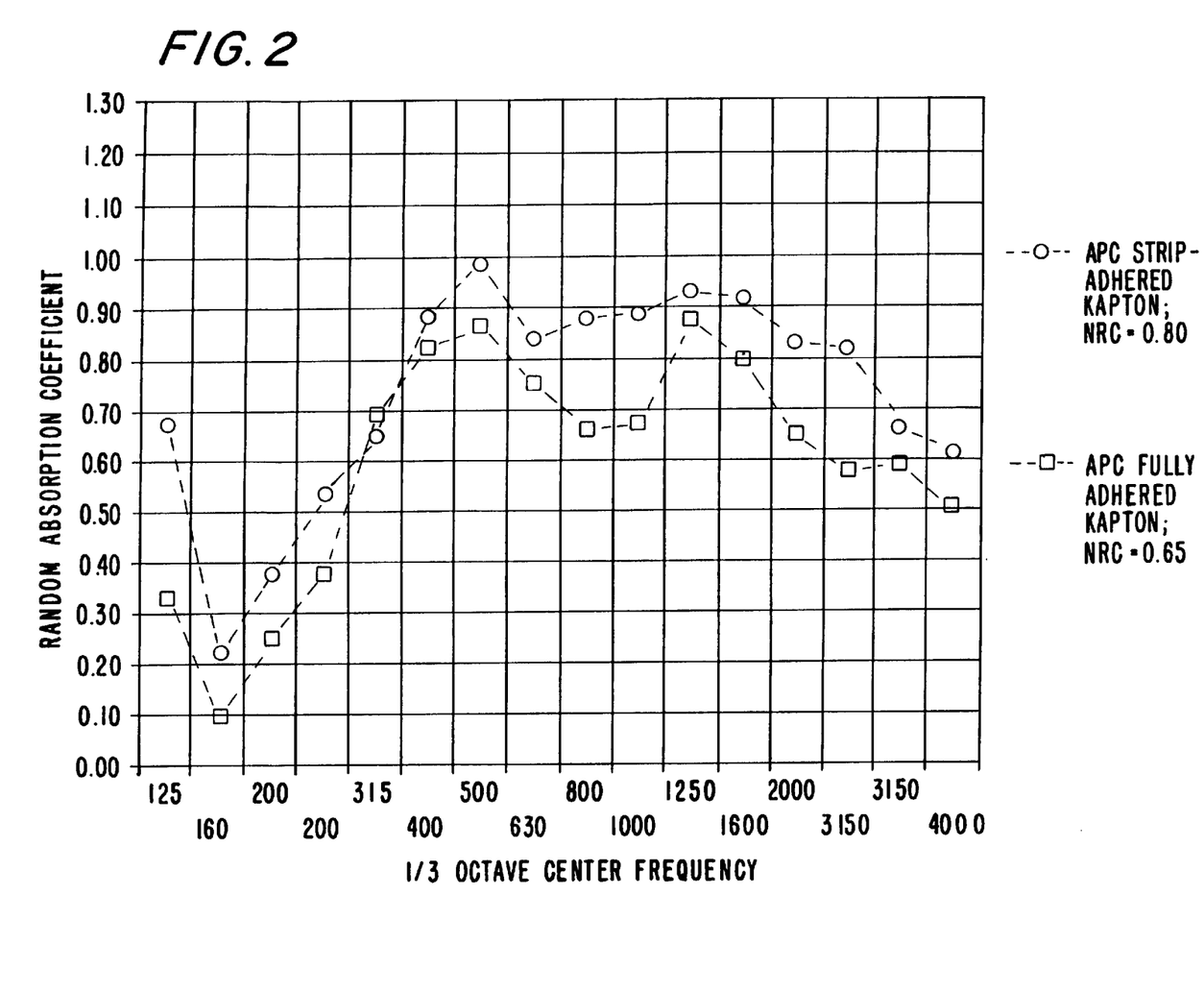
FIG. 2 is a graph of the noise reduction coefficients for panels of the present invention.
Figure 3:
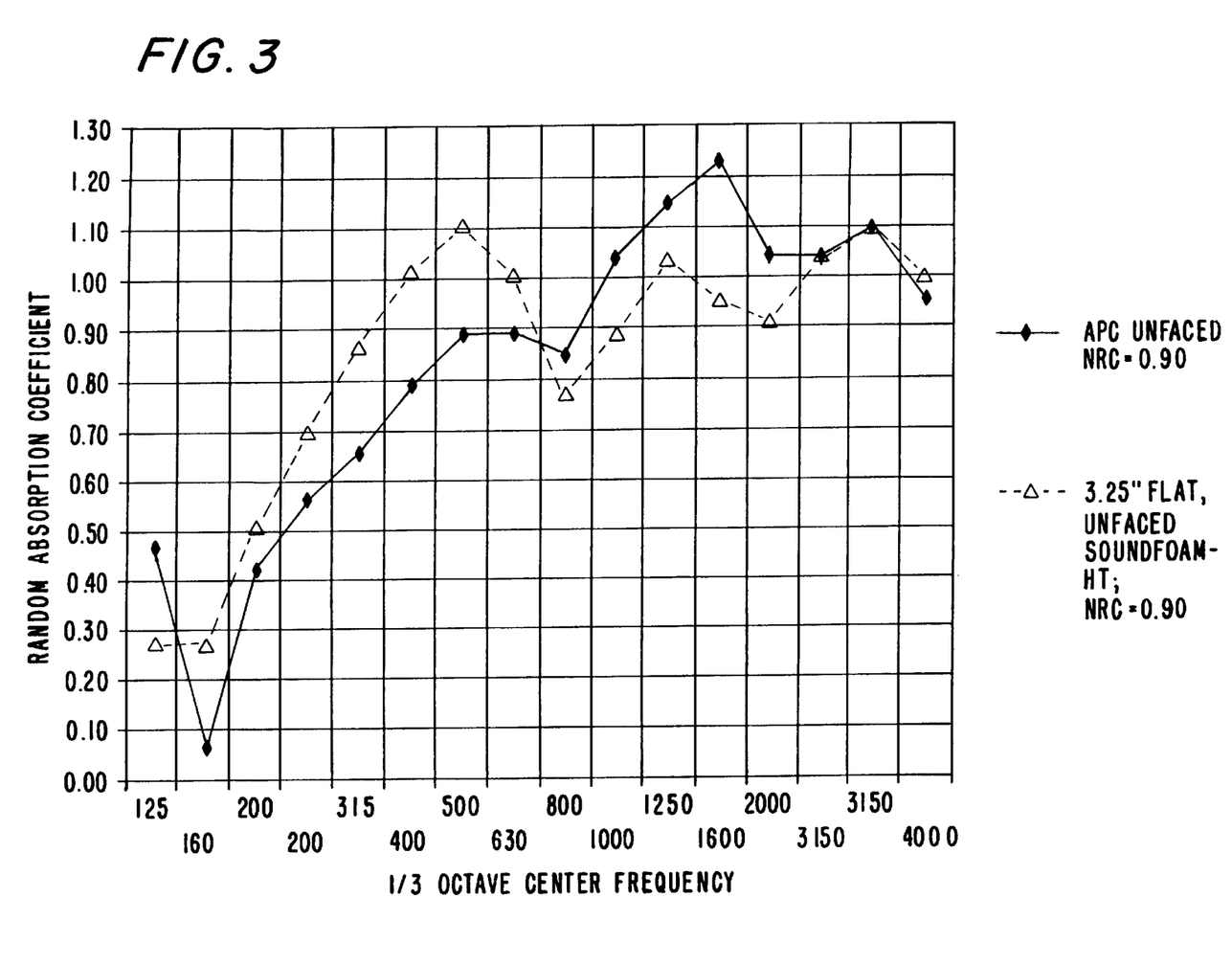
FIG. 3 is a graph of the noise reduction coefficients for panels of the present and invention and plain foam.

FIGS. 2 and 3 graphically illustrate these results. FIG. 2 shows the results for panels 1 and 2, while FIG. 3 shows the results for panels 3 and 4. From both of these graphs it can be seen that the acoustic absorption performance of the panels generally decreases when adhesive is applied to a greater area, and increases with adhesive applied to a lesser area and the removal of layer 30. Thus, there is a trade-off between anti-billowing and acoustic absorption since the more adhesive that is applied, the more the panel will resist billowing, however this tends to reduce acoustic performance. Strip-adhering the layer 30 to member 20 is a good compromise between these two competing effects.

While the panels 10 are shown as substantially rectangular structures, they can be made of any shape or size necessary for the particular fairing, or payload required. It will be further recognized by those with skill in the art that panels 10 may contain other materials for other purposes, for example, the absorption of frequencies outside the particular acoustic range allowed by absorbing members 20. Additionally, materials may be added to absorb microwaves, radio frequency waves or other electromagnetic energy.

Figure 4:
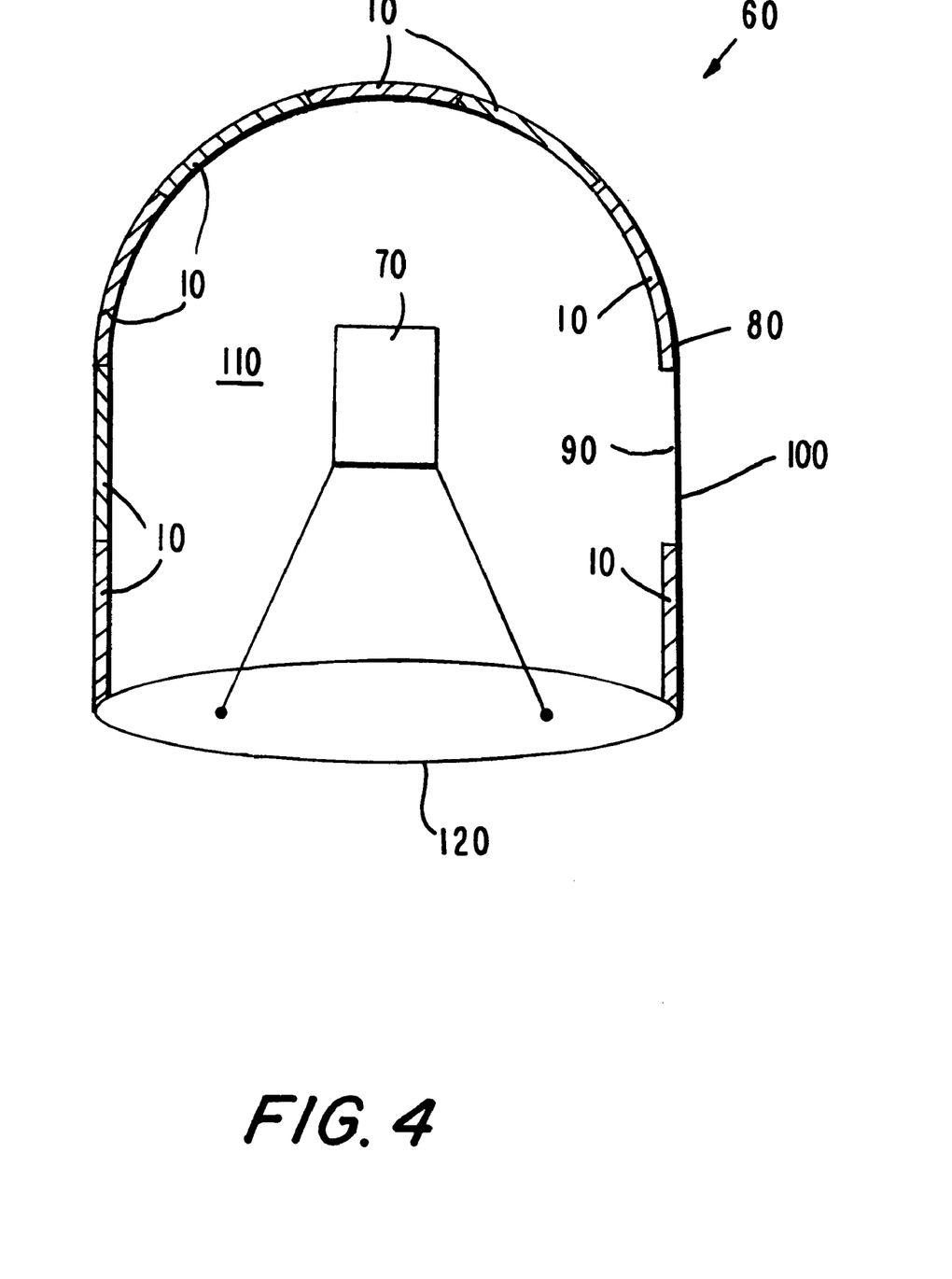
FIG. 4 is a perspective view of a fairing having sound absorbing panels provided in accordance with the present invention.

Referring now to FIG. 4, a fairing 60 for housing a payload, or satellite 70 which will be lifted by a rocket (not shown) during launch is illustrated. As described above, fairing 60 and payload 70 will experience acoustic driving forces as a result of the rocket's trust during launch. The fairing 60 preferably comprises a walled structure 80 having an inside surface 90 and an outside surface 100, which define a cavity 110 for housing payload 70. The cavity 110 has an atmosphere conducive to the proper operation and maintenance of payload 70 during launch. A plurality of absorbing panels 10 are affixed to the inside surface 90. The panels 10 may line the entire inside surface 90 of the fairing and on the floor 120 thereof, or may be randomly placed throughout the fairing depending on the anticipated air pressure that will be experienced during liftoff.

Panels 10 may be attached to surface 90 with a pressure sensitive adhesive which is applied to the upper surface of layer 30. More preferably, the upper surface of the panels 10 are configured with the polyimide layer 30 which is then coated with an adhesive followed by a protective backing which can be removed just prior to installation of the panels 20 on the surface 90, thereby exposing the adhesive on the upper surfaces thereof. In this manner a "peel and stick" installation can be advantageously obtained for the panels in the fairings which greatly reduces the preparation and assembly time of fairings with acoustic absorbing panels provided in accordance with present invention as compared to prior acoustic absorbing panels and methods of installation. Moreover, the use of an adhesive to secure the acoustic panels of the present invention to the inside walls of fairings ensures that the panels will be permanently mounted thereto and will not detach. This fully protects the payloads from the panels since the panels will not detach from the walls 90 and bump into or hit the payloads. It is preferable that up to nearly 100% of the panels' upper surfaces adhere to the surface 90 and with the peel and stick application which is realized in accordance with the present invention, this goal can be achieved. The inventors believe that the use of adhesives to secure acoustic panels to fairings has not heretofore been employed.

Panels 10 are preferably cooperatively jointed at their ends to form a system of acoustic panels inside fairing 60, and along surface 90. Furthermore, when it is desired to allow the panels 10 to discharge static electricity, the panels may be connected with electrically conductive straps 65 (FIG. 1) to allow such discharge. The straps should have a maximum resistance of about 2,000 ohms. Panels 10 may also be cooperatively joined with acoustic absorbing panels of different sizes and designs, or of different constructions such as those shown in the aforementioned Borchers et al. patent.

The acoustic panels, fairings, and acoustic absorbing systems of the present invention thus solve long felt needs in the art for efficient absorbers of acoustic energy during launch, while minimizing atmospheric contamination that will damage the payload. The panels of the present invention are versatile and simple to manufacture, thereby minimizing their costs. Furthermore since these panels are substantially lighter than prior acoustic absorbing panels, they greatly increase the efficiency of the lift vehicle, also reducing the overall cost of the particular mission which the satellite or payload will fulfill. Such results have not heretofore been achieved in the art.

While there has been shown and described certain fundamental novel features of the present invention as applied to a preferred embodiment thereof, it will be understood by those skilled in the art that various omissions and substitutions and changes in the devices and methods described herein, and in their operation, may be made by those with skill in the art without departing from the spirit and scope of the present invention. It is expressly intended that all combinations of those elements and/or method steps would perform substantially the same function and substantially the same way to achieve substantially the same results are within the scope of the invention. Substitutions of elements from one described embodiment to another are also fully intended and contemplated. It is also to be understood that the drawings are not necessarily drawn to scale, but they are merely conceptual in nature. It is the intention, therefore, to be limited only as indicated by the scope of the claims appended hereto.

The invention is not limited by the embodiments described above which are presented as examples only but can be modified in various ways within the scope of protection defined by the appended patent claims.

What is claimed is:

1. A light-weight, acoustic absorber for absorbing acoustic energy in a specific frequency range during launch of a payload by a rocket, the acoustic absorber being adapted to line an inside cavity of a fairing containing the payload, comprising:

an acoustic absorbing member having a surface, and which is substantially permeable to gases during launch of the payload;

a layer, attached to the surface of the acoustic absorbing member, which is substantially impermeable to the gases and substantially impermeable to any contaminants which may be emitted by the acoustic absorbing member;

a plurality of vents formed in the layer, which provide gas communication between the acoustic absorbing member and the fairing to accommodate changes in pressure of the gases during launch, so as to prevent ballooning of the acoustic absorber during launch; and a plurality of filters in one-to-one correspondence with the vents, which are permeable to the gases, but impermeable to the contaminants.

2. The acoustic absorber recited in claim 1, wherein the acoustic member comprises a foam material.

3. The acoustic absorber recited in claim 2, wherein the foam comprises a polyimide.

4. The acoustic absorber recited in claim 1, wherein the layer comprises a metallized layer.

5. The acoustic absorber recited in claim 4, wherein the metallized layer comprises a metallized polyimide.

6. The acoustic absorber recited in claim 5, wherein the metallized polyimide has a resistivity of less than about 10,000 ohms per square.

7. The acoustic absorber recited in claim 1, wherein the filters comprise a non-woven polyester material.

8. The acoustic absorber recited in claim 1, wherein the absorber absorbs acoustic energy in a range of about 125 Hz to about 4000 Hz.

9. The acoustic absorber recited in claim 8, wherein the absorber absorbs acoustic energy at about 125 Hz.

10. The acoustic absorber recited in claim 8, wherein the absorber absorbs acoustic energy at about 250 Hz.

11. The acoustic absorber recited in claim 8, wherein the absorber absorbs acoustic energy at about 500 Hz.

12. The acoustic absorber recited in claim 8, wherein the absorber absorbs acoustic energy at about 1000 Hz.

13. The acoustic absorber recited in claim 8, wherein the absorber absorbs acoustic energy at about 2000 Hz.

14. An acoustic absorber comprising:

foam absorbing means for absorbing acoustic vibrations in a specified frequency range;

impermeable means, attached to the foam absorbing means, for preventing contaminants from escaping from the foam absorbing means to atmospheric gases;

vent means, formed in the impermeable means, for allowing gases to pass through the foam absorbing means; and filter means, placed over the vent means, for filtering the contaminants so they do not contaminate the atmospheric gases and so particulates in the atmospheric gases do not contaminate the foam absorbing means.

15. The acoustic absorber recited in claim 14, wherein the foam absorbing means comprises a polyimide foam layer having a surface.

16. The acoustic absorber recited in claim 15, wherein the impermeable means comprises a metallized polyimide layer attached to the surface of the polyimide foam layer.

17. The acoustic absorber recited in claim 16, wherein the vent means comprises a plurality of openings formed in the metallized polyimide layer.

18. The acoustic absorber recited in claim 17, wherein the filter means comprises a plurality of non-woven polyester sections in one-to-one correspondence with the plurality of vents.

19. The acoustic absorber recited in claim 18, wherein the metallized polyimide layer substantially surrounds the polyimide foam layer.

20. The acoustic absorber recited in claim 18, wherein the absorber absorbs acoustic energy in a range of about 125 Hz to about 4000 Hz.

21. The acoustic absorber recited in claim 20, further comprising a gas permeable adhesive attaching the metallized polyimide layer to the polyimide foam layer.

22. The acoustic absorber recited in claim 21, further comprising a gas impermeable adhesive for attaching the filters to the metallized polyimide layer.

23. A fairing for housing a payload which will be lifted by a rocket during a launch and which experiences acoustic forces as a result of rocket thrust during launch and differential pressure, comprising:

a walled structure having an inside surface and an outside surface, the inside surface defining a cavity for housing the payload, the cavity having an atmosphere during launch; and an acoustic absorber for absorbing acoustic energy in a specific frequency range, affixed to the inside surface, the acoustic absorber comprising, foam absorbing means for absorbing the acoustic energy;

impermeable means, attached to the foam absorbing means, for preventing contaminants from escaping from the foam absorbing means to atmospheric gases;

vent means, formed in the impermeable means, for allowing the atmospheric gases to pass through the foam absorbing means during launch; and filter means, placed over the vent means for filtering the contaminants so they do not contaminate the atmospheric gases and so particulates in the atmospheric gases do not contaminate the foam absorbing means.

24. The acoustic absorber recited in claim 23, wherein the foam absorbing means comprises a polyimide foam layer having a surface.

25. The fairing recited in claim 24, wherein the impermeable means comprises a metallized polyimide layer attached to the surface of the polyimide foam layer.

26. The fairing recited in claim 25, wherein the vent means comprises a plurality of openings formed in the metallized polyimide layer.

27. The fairing recited in claim 26, wherein the filter means comprises a plurality of non-woven polyester sections in one-to-one correspondence with the plurality of vents.

28. The fairing recited in claim 27, wherein the metallized polyimide layer substantially surrounds the polyimide foam layer.

29. The fairing recited in claim 27, wherein the absorber absorbs acoustic energy in a range of about 125 Hz to about 4000 Hz.

30. The fairing recited in claim 29, further comprising a gas permeable adhesive attaching the metallized polyimide layer to the polyimide foam layer.

31. The fairing recited in claim 30, further comprising a gas impermeable adhesive for attaching the filters to the metallized polyimide layer.

32. The fairing recited in claim 23, wherein the acoustic absorber conforms in shape to the inside surface of the walled structure.

33. The fairing recited in claim 23, further comprising a plurality of acoustic absorbers which conform in shape to substantially all of the inside surface of the walled structure.

34. A method of manufacturing an acoustic absorbing panel that is adapted to absorb acoustic energy in a specific frequency range, comprising the steps of:

densifying an acoustic absorbing foam having a surface to reducing the foam's height by a specific amount while keeping the foam's mass constant;

adhering a layer to the surface of the foam which is substantially impermeable to atmospheric gases;

cutting vents in the layer in specified locations to allow the atmospheric gases to pass through the vents and the acoustic absorbing foam; and adhering filters over the vents to prevent contaminating particles associated with the absorbing foam from leaking from the foam through the vents to the atmospheric gases.

35. The method recited in claim 34, wherein the foam's height is reduced by at least 50%.

* * * * *